United States Patent
Wada et al.

(10) Patent No.: US 8,252,462 B2
(45) Date of Patent: Aug. 28, 2012

(54) NON-AQUEOUS ELECTROLYTE SECONDARY BATTERY

(75) Inventors: Naoyuki Wada, Osaka (JP); Yoshiyuki Ozaki, Osaka (JP); Shinji Kasamatsu, Osaka (JP); Yukihiro Okada, Osaka (JP)

(73) Assignee: Panasonic Corporation, Osaka (JP)

( * ) Notice: Subject to any disclaimer, the term of this patent is extended or adjusted under 35 U.S.C. 154(b) by 379 days.

(21) Appl. No.: 12/434,873

(22) Filed: May 4, 2009

(65) Prior Publication Data

US 2009/0286164 A1   Nov. 19, 2009

(30) Foreign Application Priority Data

May 16, 2008   (JP) .................................. 2008-129988

(51) Int. Cl.
*H01M 4/58*   (2010.01)
(52) U.S. Cl. ............... 429/231.1; 429/231.3; 429/231.6; 429/225; 429/330; 429/129; 429/246; 429/234
(58) Field of Classification Search ............... 429/231.1, 429/231.3, 231.6, 225, 330, 129, 246, 234
See application file for complete search history.

(56) References Cited

U.S. PATENT DOCUMENTS

| | | | | |
|---|---|---|---|---|
| 5,705,292 | A * | 1/1998 | Yukita et al. | 429/137 |
| 6,475,678 | B1 * | 11/2002 | Suzuki | 429/309 |
| 2002/0009651 | A1 | 1/2002 | Barker et al. | |
| 2003/0077518 | A1 | 4/2003 | Barker et al. | |
| 2005/0250014 | A1 * | 11/2005 | Kumashiro et al. | 429/303 |
| 2009/0181305 | A1 * | 7/2009 | Nagayama et al. | 429/223 |

FOREIGN PATENT DOCUMENTS

| | | |
|---|---|---|
| CN | 1333932 A | 1/2002 |
| CN | 101069305 A | 11/2007 |
| EP | 1 819 008 A1 | 8/2007 |
| EP | 1 881 545 A1 | 1/2008 |
| JP | 09-190814 | 7/1997 |
| JP | 2005-032701 | 2/2005 |
| WO | WO 2006/134833 | * 12/2006 |

OTHER PUBLICATIONS

Chinese Office Action issued in Chinese Patent Application No. 200910138062.8, mailed Dec. 31, 2010.

* cited by examiner

*Primary Examiner* — Laura Weiner
(74) *Attorney, Agent, or Firm* — McDermott Will & Emery LLP (57) ABSTRACT

A non-aqueous electrolyte secondary battery includes a positive electrode, a negative electrode, a non-aqueous electrolyte, and an insulating layer formed on a surface of the positive electrode. The positive electrode includes a lithium nickel composite oxide having a layer structure, and the lithium nickel composite oxide is represented by the general formula: $Li_xNi_yM_{1-y}O_2$ where M is at least one selected from the group consisting of Na, Mg, Sc, Y, Mn, Fe, Co, Cu, Zn, Al, Cr, Pb, Sb, and B, $0<x\leq1.2$, and $0.5<y\leq1.0$. The non-aqueous electrolyte includes a solute and a non-aqueous solvent dissolving the solute, and the non-aqueous solvent contains 40% by weight or more of a cyclic carbonic acid ester. The insulating layer includes an insulating polymeric material.

4 Claims, 2 Drawing Sheets

NON-AQUEOUS ELECTROLYTE SECONDARY BATTERY

FIELD OF THE INVENTION

The invention relates to non-aqueous electrolyte secondary batteries. Particularly, it pertains to a non-aqueous electrolyte secondary battery in which gas production at the positive electrode is suppressed.

BACKGROUND OF THE INVENTION

Recently, electronic devices have been rapidly becoming cordless and more portable. As the power source for such electronic devices, there has been an increasing demand for secondary batteries that are small, light-weight, and have high energy density. In addition to small-sized commercial applications, technologies for large-sized secondary batteries for use in power storage devices and electric vehicles have also been developed in an accelerating manner.

Among them, non-aqueous electrolyte secondary batteries, in particular, lithium secondary batteries have high voltage and high energy density. They are thus expected to be used as the power source for electronic devices, power storage devices, electric vehicles, etc. In these applications, secondary batteries are required to provide durability and safety over an extended period of time.

A non-aqueous electrolyte secondary battery includes an electrode assembly and a non-aqueous electrolyte which are contained in a battery case. The electrode assembly includes a positive electrode, a negative electrode, and a separator interposed between them. The separator is, for example, a microporous film made of polyolefin.

The positive electrode includes a positive electrode current collector and a positive electrode mixture layer formed on the positive electrode current collector. The positive electrode active material is a lithium-containing transition metal oxide, since it has a high potential relative to lithium, offers good safety, and can be synthesized relatively easily. For example, a lithium cobalt oxide (e.g., $LiCoO_2$) is used.

The negative electrode includes a negative electrode current collector and a negative electrode mixture layer formed on the negative electrode current collector. As the negative electrode active material, for example, various carbon materials such as graphite are used.

The non-aqueous electrolyte is a liquid non-aqueous electrolyte including a lithium salt, such as $LiBF_4$ or $LiPF_6$, dissolved in an aprotic non-aqueous solvent. As the components of the aprotic non-aqueous solvent, cyclic carbonic acid esters, such as ethylene carbonate and propylene carbonate, and chain carbonic acid esters, such as dimethyl carbonate and ethyl methyl carbonate, are used.

When non-aqueous electrolyte secondary batteries are stored at high temperatures or continuously charged, gas is produced due to the decomposition of the non-aqueous electrolyte. Hence, with the aim of enhancing battery performance, attempts have been made to improve the non-aqueous electrolyte. Japanese Laid-Open Patent Publication No. 2005-32701 (hereinafter "Patent Document 1") proposes a non-aqueous electrolyte containing $LiBF_4$ and $LiPF_6$ as solutes and ethylene carbonate, propylene carbonate, a chain carbonic acid ester, and vinylene carbonate as non-aqueous solvents, in order to suppress gas production.

Japanese Laid-Open Patent Publication No. Hei 9-190814 (hereinafter "Patent Document 2") proposes forming a heat-resistant insulating layer with a predetermined thickness on the surface of at least one of a positive electrode and a negative electrode, in order to prevent a short-circuit due to the direct contact of the positive and negative electrodes and suppress the expansion of an internal short-circuit. When heat, an external short circuit, or an internal short-circuit causes battery temperature to rise and a separator made of a polyolefin microporous film melts, the heat-resistant insulating layer maintains insulation between the positive electrode and the negative electrode. As a result, battery safety improves.

BRIEF SUMMARY OF THE INVENTION

To heighten the capacity and reliability of a non-aqueous electrolyte secondary battery, it is effective to use a lithium nickel composite oxide having a layer structure represented by the general formula: $Li_xNi_yM_{1-y}O_2$ where M is at least one selected from the group consisting of Na, Mg, Sc, Y, Mn, Fe, Co, Cu, Zn, Al, Cr, Pb, Sb, and B, $0<x\leq1.2$ and $0.5<y\leq1.0$ as a positive electrode active material, in combination with a non-aqueous electrolyte including a non-aqueous solvent composed mainly of a cyclic carbonic acid ester.

However, when a lithium nickel composite oxide is included as a positive electrode active material, ethylene carbonate or propylene carbonate contained in the non-aqueous solvent is subject to oxidation on the positive electrode surface since the positive electrode active material is strongly alkaline. Although the technique of Patent Document 1 is effective in suppressing gas production at the negative electrode, it increases the production of gas such as carbon dioxide at the positive electrode.

It is therefore an object of the invention to suppress gas production particularly at the positive electrode in a highly reliable, high-capacity non-aqueous electrolyte secondary battery.

A non-aqueous electrolyte secondary battery of the invention includes:

a positive electrode including a lithium nickel composite oxide having a layer structure, the lithium nickel composite oxide being represented by the general formula: $Li_xNi_yM_{1-y}O_2$ where M is at least one selected from the group consisting of Na, Mg, Sc, Y, Mn, Fe, Co, Cu, Zn, Al, Cr, Pb, Sb, and B, $0<x\leq1.2$, and $0.5<y\leq1.0$;

a negative electrode;

a non-aqueous electrolyte including a solute and a non-aqueous solvent dissolving the solute, the non-aqueous solvent containing 40% by weight or more of a cyclic carbonic acid ester; and an insulating layer formed on a surface of the positive electrode, the insulating layer including an insulating polymeric material.

Preferably, the insulating layer further includes insulating inorganic oxide particles and is porous.

The non-aqueous electrolyte secondary battery of the invention can further include a separator between the positive electrode and the negative electrode.

Preferably, the cyclic carbonic acid ester is at least one selected from the group consisting of ethylene carbonate and propylene carbonate.

More preferably, the non-aqueous solvent contains 60 to 90% by weight of the cyclic carbonic acid ester.

Preferably, the insulating polymeric material includes at least one selected from the group consisting of fluorocarbon resin and modified acrylic rubber.

Preferably, the insulating inorganic oxide particles include at least one selected from the group consisting of alumina, zirconia, silica, titania, and magnesia.

According to the invention, in a highly reliable, high-capacity non-aqueous electrolyte secondary battery, it is possible to suppress gas production not only at the negative electrode but also at the positive electrode.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

The non-aqueous electrolyte secondary battery of the invention includes: a positive electrode including a lithium nickel composite oxide having a layer structure, the lithium nickel composite oxide being represented by the general formula: $Li_xNi_yM_{1-y}O_2$ where M is at least one selected from the group consisting of Na, Mg, Sc, Y, Mn, Fe, Co, Cu, Zn, Al, Cr, Pb, Sb, and B, $0<x\leq1.2$, and $0.5<y\leq1.0$; a negative electrode; a non-aqueous electrolyte including a solute and a non-aqueous solvent dissolving the solute, the non-aqueous solvent containing 40% by weight or more of a cyclic carbonic acid ester; and an insulating layer formed on a surface of the positive electrode, the insulating layer including an insulating polymeric material.

The positive electrode and the negative electrode are laminated or wound, with the insulating layer and, if necessary, a separator interposed therebetween, to form an electrode assembly. The electrode assembly and the non-aqueous electrolyte are housed in a battery case.

The lithium nickel composite oxide represented by the general formula $Li_xNi_yM_{1-y}O_2$ where $0.5<y\leq1.0$ has a high capacity. Thus, the use of the lithium nickel composite oxide as the positive electrode active material can provide a high-capacity non-aqueous electrolyte secondary battery.

Cyclic carbonic acid esters are unlikely to be reductively decomposed at the negative electrode. Hence, the use of a non-aqueous solvent containing 40% by weight or more of a cyclic carbonic acid ester suppresses the reductive decomposition of the non-aqueous electrolyte at the negative electrode, thereby suppressing gas production.

When the lithium nickel composite oxide where $0.5<y\leq1.0$ is prepared synthetically, it is difficult to use lithium carbonate as a raw material, so lithium hydroxide is used as the raw material. The resulting positive electrode active material is more alkaline than that prepared by using lithium carbonate as the raw material. Also, cyclic carbonic acid esters are subject to oxidation on the positive electrode surface, and this tendency becomes evident when the alkalinity of the positive electrode becomes high. In the invention, since the content of the cyclic carbonic acid ester in the non-aqueous solvent is relatively high, gas production at the positive electrode is expected to further increase.

Therefore, in the invention, an insulating layer including an insulating polymeric material is formed on a surface of the positive electrode. It should be noted that the insulating layer has ionic conductivity. The formation of the predetermined insulating layer on the positive electrode can significantly suppress the oxidation decomposition of the cyclic carbonic acid ester at the positive electrode. As a result, gas production at the negative and positive electrodes can be significantly suppressed in the highly reliable, high-capacity non-aqueous electrolyte secondary battery.

Although the detailed reason why the formation of the insulating layer on the positive electrode surface significantly suppresses gas production at the positive electrode is not yet clear, it is probably as follows.

When an insulating paste containing an insulating polymeric material is applied to the positive electrode to form an insulating layer on the positive electrode surface, the insulating paste permeates the positive electrode, so that at least part of the surface of the positive electrode active material contained in the positive electrode is covered with the insulating polymeric material. In the invention, since the content of the cyclic carbonic acid ester is relatively high, as described above, and the lithium nickel composite oxide where $0.5<y\leq1.0$ is used, the amount of gas produced at the positive electrode is expected to be large. However, by coating the surface of the positive electrode active material with the insulating polymeric material to reduce the area of the positive electrode active material to come into direct contact with the non-aqueous electrolyte, gas production at the positive electrode can be significantly suppressed.

Also, the positive electrode has a low porosity and a low electrolyte-retaining ability. It is thus difficult for the non-aqueous electrolyte to evenly permeate the positive electrode. Hence, the reaction proceeds unevenly, and the positive electrode is thought to have areas where the current density is high and areas where the current density is low. In the high current-density areas, gas production is promoted. However, since the insulating layer has a higher electrolyte-retaining ability than the positive electrode, the formation of the insulating layer on the positive electrode surface is thought to make the positive electrode reaction uniform. In the invention, since the positive electrode reaction is made uniform, the positive electrode is unlikely to have areas with varied current densities. Therefore, although the invention uses the above-mentioned combination of the non-aqueous electrolyte and the positive electrode active material which promotes gas production, gas production at the positive electrode is significantly suppressed.

The insulating layer preferably contains insulating inorganic oxide particles. The insulating layer containing insulating inorganic oxide particles has an excellent electrolyte-retaining ability, thereby making the positive electrode reaction more uniform. As a result, gas production at the positive electrode can be suppressed more effectively. Also, the insulating layer containing inorganic oxide particles has excellent heat resistance. Hence, even when the battery temperature rises and the separator melts, the insulating layer permits insulation between the positive electrode and the negative electrode. Therefore, the safety of the non-aqueous electrolyte secondary battery improves.

Examples of insulating inorganic oxide particles which can be used include alumina, zirconia, silica, titania, and magnesia. Among them, the use of alumina is preferable, and α-alumina is particularly preferable. α-alumina is chemically stable, and high purity α-alumina is particularly stable. Since alumina is unlikely to react with the non-aqueous electrolyte or be oxidized or reduced, it is unlikely to have an adverse effect on the battery. In terms of the electrolyte-retaining ability of the insulating layer, it is preferable that the insulating inorganic oxide particles be composed of a plurality of primary particles that are diffused and bound three-dimensionally. By suitably crushing baked particles that are bound three-dimensionally, it is possible to obtain insulating inorganic oxide particles including polycrystalline particles having shapes that resist high density packing, such as coral, cluster, and dendrite shapes. The insulating inorganic oxide particles allow the insulating layer to have a suitable porosity.

While the mean particle size of the inorganic oxide particles is not particularly limited, it is preferably 0.05 to 5 μm. In the invention, mean particle size refers to volume basis median diameter. In terms of enhancing the ionic conductivity of the insulating layer, it is preferable that sufficient gaps exist between the inorganic oxide particles. In this respect, it is preferable to use fluorocarbon resin, modified acrylic rubber, or the like as the insulating polymeric material, but there is no particular limitation.

Examples of the fluorocarbon resin include polyvinylidene fluoride (PVDF), polytetrafluoroethylene (PTFE), a copolymer of tetrafluoroethylene-hexafluoropropylene (FEP), and a copolymer of vinylidene fluoride-hexafluoropropylene.

The weight-average molecular weight of the modified acrylic rubber is, for example, 3000 or more and 300000 or less.

The modified acrylic rubber is preferably a copolymer including an acrylonitrile unit, since it has a good balance between flexibility and strength. In particular, a resin including a polyacrylonitrile chain has a good balance between flexibility and strength.

In addition to an acrylonitrile unit, the modified acrylic rubber can include, for example, acrylic acid; an acrylic acid alkyl ester such as methyl acrylate, n-propyl acrylate, isopropyl acrylate, t-butyl acrylate, hexyl acrylate, cyclohexyl acrylate, or dodecyl acrylate; or a methacrylic acid alkyl ester such as methyl methacrylate, n-propyl methacrylate, isopropyl methacrylate, t-butyl methacrylate, hexyl methacrylate, cyclohexyl methacrylate, or dodecyl methacrylate.

The amount of the inorganic oxide particles in the insulating layer is preferably 85 to 99% by weight. In this case, since the insulating layer has sufficient heat resistance, the battery safety further improves.

The thickness of the insulating layer is preferably 50 μm or less, and more preferably 30 μm or less in terms of reducing the battery weight and heightening the energy density. When the thickness of the insulating layer is 2 μm or more, sufficient insulation can be obtained, which is preferable. The porosity of the insulating layer is preferably 40 to 75%. In this case, it is possible to increase the electrolyte-retaining ability of the insulating layer while maintaining the insulating ability thereof. Hence, the reaction between the positive electrode and the negative electrode becomes more uniform. As used herein, the porosity of the insulating layer refers to the ratio of the pore volume to the volume of the insulating layer.

The non-aqueous electrolyte secondary battery of the invention may or may not include a separator. When a separator is included, the total thickness of the insulating layer and the separator is preferably 15 to 50 μm, and more preferably 15 to 30 μm. When no separator is included, the insulating layer preferably has a sufficient thickness, for example, 10 to 50 μm. In this case, the production cost of the non-aqueous electrolyte secondary battery can be reduced.

The separator preferably has ion permeability, mechanical strength, and an insulating ability. Examples include microporous films, woven fabric, and non-woven fabric which are made of polyolefins such as polypropylene and polyethylene. Since polyolefins have good durability and a shut-down function, they are preferable in terms of further improving the safety of the non-aqueous electrolyte secondary battery.

While the thickness of the separator is commonly 10 to 300 μm, it is preferably, for example, 40 μm or less, and more preferably 15 to 30 μm.

The separator may be a mono-layer film composed of a single material, or may be a composite film or a multi-layer film made of two or more materials. The porosity of the separator is preferably 30 to 70%, and more preferably 35 to 60%. As used herein, the porosity refers to the ratio of the pore volume to the volume of the separator.

The insulating layer is formed, for example, as follows.

Insulating inorganic oxide particles, an insulating polymeric material, and a dispersion medium are mixed together to prepare an insulating paste. This insulating paste is applied onto both sides of the positive electrode and dried to form insulating layers.

The non-aqueous electrolyte can be a liquid, gelled, or solid (solid polymer electrolyte) substance.

The non-aqueous electrolyte contains a solute and a non-aqueous solvent. In the invention, the non-aqueous solvent contains 40% by weight or more of a cyclic carbonic acid ester. Cyclic carbonic acid esters are inherently resistant to reductive decomposition at the negative electrode. Thus, the inclusion of 40% by weight or more of a cyclic carbonic acid ester in the non-aqueous solvent can suppress the reductive decomposition of the non-aqueous electrolyte at the negative electrode. The content of the cyclic carbonic acid ester in the non-aqueous solvent is more preferably 60 to 90% by weight.

The cyclic carbonic acid ester preferably includes at least one selected from the group consisting of ethylene carbonate and propylene carbonate, and more preferably includes both of them. When ethylene carbonate (EC) and propylene carbonate (PC) are used in combination, the weight ratio (EC:PC) is preferably from 2:8 to 8:2, and more preferably from 3:7 to 5:5. In this case, the viscosity of the non-aqueous electrolyte does not become too high, and the charge/discharge characteristics of the battery further improves.

When a chain carbonic acid ester is added to the non-aqueous solvent containing 40% by weight or more of the cyclic carbonic acid ester, the viscosity of the non-aqueous electrolyte can be reduced. In this case, the charge/discharge characteristics of the non-aqueous electrolyte can be improved. When a chain carbonic acid ester is additionally used as a non-aqueous solvent, the weight ratio of the cyclic carbonic acid ester to the chain carbonic acid ester is preferably from 5:5 to 10:0, and more preferably from 6:4 to 9:1. If the weight ratio of the chain carbonic acid ester to the total of the cyclic carbonic acid ester and the chain carbonic acid ester exceeds 50% by weight, gas generation derived from the decomposition of the chain carbonic acid ester may occur at the negative electrode. Examples of chain carbonic acid esters include diethyl carbonate (DEC), ethyl methyl carbonate (EMC), and dimethyl carbonate (DMC).

A cyclic carboxylic acid ester or the like can be further added to the non-aqueous solvent. Examples of cyclic carboxylic acid esters include γ-butyrolactone (GBL) and γ-valerolactone (GVL).

The solute is not particularly limited. For example, $LiClO_4$, $LiBF_4$, $LiPF_6$, $LiAlCl_4$, $LiSbF_6$, $LiSCN$, $LiCF_3SO_3$, $LiCF_3CO_2$, $LiAsF_6$, $LiB_{10}Cl_{10}$, lithium lower aliphatic carboxylates, LiCl, LiBr, LiI, chloroborane lithium, borates, imide salts, etc. can be used as solutes. These solutes can be used singly or in combination of two or more of them. The concentration of the solute dissolved in the non-aqueous electrolyte is desirably 0.5 to 2 mol/L.

The non-aqueous electrolyte may contain as an additive a compound that will be decomposed on the negative electrode to form a coating film having high lithium conductivity. The addition of such an additive improves the coulombic efficiency of the non-aqueous electrolyte secondary battery. Examples of additives include vinylene carbonate (VC), 4-methyl vinylene carbonate, 4,5-dimethyl vinylene carbonate, 4-ethyl vinylene carbonate, 4,5-diethyl vinylene carbonate, 4-propyl vinylene carbonate, 4,5-dipropyl vinylene carbonate, 4-phenyl vinylene carbonate, 4,5-diphenyl vinylene carbonate, vinyl ethylene carbonate (VEC), and divinyl ethylene carbonate. These additives can be used singly or in combination of two or more of them. Among them, it is preferable to use at least one selected from the group consisting of vinylene carbonate, vinyl ethylene carbonate, and divinyl ethylene carbonate. In these additives, part of the hydrogen atoms may be replaced with fluorine atoms.

The non-aqueous electrolyte may further contain a sultone compound such as 1,3-propanesultone or 1,4-butanesultone. The sultone compound forms a coating film on the positive electrode and can thus suppress the decomposition of the non-aqueous solvent at the positive electrode, but it tends to separate from the positive electrode during discharge. However, in the invention, since the insulating layer is formed on the positive electrode, the separation of the sultone compound during discharge can be suppressed. It is thus possible to suppress gas production more effectively. These sultone compounds can be used singly or in combination of two or more of them. The content of the sultone compounds is preferably 10% or less by volume of the whole non-aqueous solvent.

The non-aqueous electrolyte may further contain a benzene derivative. Some benzene derivatives are decomposed during overcharge to form a coating film on an electrode, thereby inactivating the battery. Benzene derivatives having such a function include, for example, those having a phenyl group and a cyclic compound group adjacent to the phenyl group. Examples of cyclic compound groups include a phenyl group, a cyclic ether group, a cyclic ester group, a cycloalkyl group, and a phenoxy group. Examples of benzene derivatives include cyclohexyl benzene, biphenyl, and diphenyl ether. They can be used singly or in combination of two or more of them. The content of the benzene derivative is preferably 10% by volume or less of the whole non-aqueous solvent.

The positive electrode includes a positive electrode current collector and a positive electrode mixture layer formed on the positive electrode current collector. The positive electrode mixture layer contains a positive electrode active material as an essential component, and may further contain optional components such as a binder and a conductive agent.

The positive electrode active material of the invention includes a lithium nickel composite oxide having a layer structure. The lithium nickel composite oxide is represented by the general formula: $Li_xNi_yM_{1-y}O_2$ where M is at least one selected from the group consisting of Na, Mg, Sc, Y, Mn, Fe, Co, Cu, Zn, Al, Cr, Pb, Sb, and B, $0<x \leq 1.2$, and $0.5<y \leq 1.0$. The lithium molar ratio x increases/decreases due to discharge/charge. Since the lithium nickel composite oxide where $0.5<y \leq 1.0$ has a large capacity, it is effective in heightening the capacity of the non-aqueous electrolyte secondary battery. The nickel molar ratio y preferably satisfies the relation $0.5<y \leq 0.9$.

Examples of the positive electrode active material include $Li_xNiO_2$, $Li_xNi_yCo_{1-y}O_2$, $Li_xNi_yCo_zMn_{1-y-z}O_2$, and $Li_xNi_yCo_zM_{1-y-z}O_2$ where $0 \leq z<0.5$. Therein, z preferably satisfies the relation $0.1 \leq z<0.5$.

The surface of the positive electrode active material may be treated with a metal oxide, a lithium oxide, a conductive agent, or the like, or may be treated to make it hydrophobic.

The positive electrode is produced, for example, by the following method.

A positive electrode mixture is prepared by mixing a positive electrode active material with optional components such as a binder and a conductive agent. The positive electrode mixture is mixed with a liquid component to prepare a positive electrode mixture slurry. The positive electrode mixture slurry is applied onto a positive electrode current collector and dried to obtain a positive electrode.

The negative electrode includes a negative electrode current collector and a negative electrode mixture layer formed on the negative electrode current collector. The negative electrode mixture layer contains a negative electrode active material as an essential component, and may further contain optional components such as a binder.

Examples of the negative electrode active material include metal, metal fibers, carbon materials, oxides, nitrides, tin compounds, silicon compounds, and various alloy materials. Examples of carbon materials include various natural graphites, coke, partially graphitized carbon, carbon fibers, spherical carbon, various artificial graphites, and amorphous carbon. Also, simple substances such as silicon (Si) and tin (Sn), and their alloys, compounds, solid solutions, etc. are preferable since they have high capacity densities. These negative electrode active materials can be used singly or in combination of two or more of them.

Preferable silicon compounds are, for example, $SiO_x$ where $0.05<x<1.95$. It is possible to use silicon alloys, compounds, solid solutions, etc. where part of Si is replaced with at least one selected from the group consisting of B, Mg, Ni, Ti, Mo, Co, Ca, Cr, Cu, Fe, Mn, Nb, Ta, V, W, Zn, C, N, and Sn.

Applicable tin compounds include $Ni_2Sn_4$, $Mg_2Sn$, and $SnO_x$ where $0<x<2$, $SnO_2$, and $SnSiO_3$.

The negative electrode is produced, for example, by the following method.

A negative electrode mixture is prepared by mixing a negative electrode active material and optional components. The negative electrode mixture is mixed with a liquid component to prepare a negative electrode mixture slurry. The negative electrode mixture slurry is then applied onto a negative electrode current collector and dried to obtain a negative electrode.

The positive electrode mixture layer and negative electrode mixture layer may contain a binder or a conductive agent as an optional component.

The binder is not particularly limited. Examples include polyvinylidene fluoride (PVDF), polytetrafluoroethylene, polyethylene, polypropylene, aramid resin, polyamides, polyimides, polyamide-imides, polyacrylonitrile, polyacrylic acid, polymethyl acrylates, polyethyl acrylates, polyhexyl acrylates, polymethacrylic acid, polymethyl methacrylates, polyethyl methacrylates, polyhexyl methacrylates, polyvinyl pyrrolidone, polyhexafluoropropylene, styrene butadiene rubber, and carboxymethyl cellulose. They can be used singly or in combination of two or more of them. Also, the binder can be a copolymer including two or more selected from the group consisting of tetrafluoroethylene, hexafluoropropylene, vinylidene fluoride, chlorotrifluoroethylene, ethylene, propylene, and acrylic acid.

The conductive agent is not particularly limited either. Examples include graphites such as natural graphites and artificial graphites, carbon blacks such as acetylene black, ketjen black, channel black, furnace black, lamp black, and thermal black, conductive fibers such as carbon fiber and metal fiber, carbon fluoride, metal powders such as aluminum, conductive whiskers such as zinc oxide and potassium titanate, conductive metal oxides such as titanium oxide, and organic conductive materials such as phenylene derivatives.

With respect to the weight ratio of the positive electrode active material, the conductive agent, and the binder, it is desirable to use 80 to 97% by weight of the positive electrode active material, 1 to 19% by weight of the conductive agent, and 1 to 10% by weight of the binder.

With regard to the weight ratio of the negative electrode active material and the binder, it is desirable to use 90 to 99% by weight of the negative electrode active material and 1 to 10% by weight of the binder.

The current collector can be, for example, a long conductive substrate. The conductive substrate may be porous. The positive electrode current collector can be made of, for example, stainless steel, aluminum, or titanium. The negative electrode current collector can be made of, for example, stainless steel, nickel, or copper.

While the thickness of the current collector is not particularly limited, it is preferably, for example, 1 to 50 μm, and more preferably 5 to 20 μm. In this case, it is possible to make the electrode light-weight while maintaining the strength of the electrode.

Figure 1:
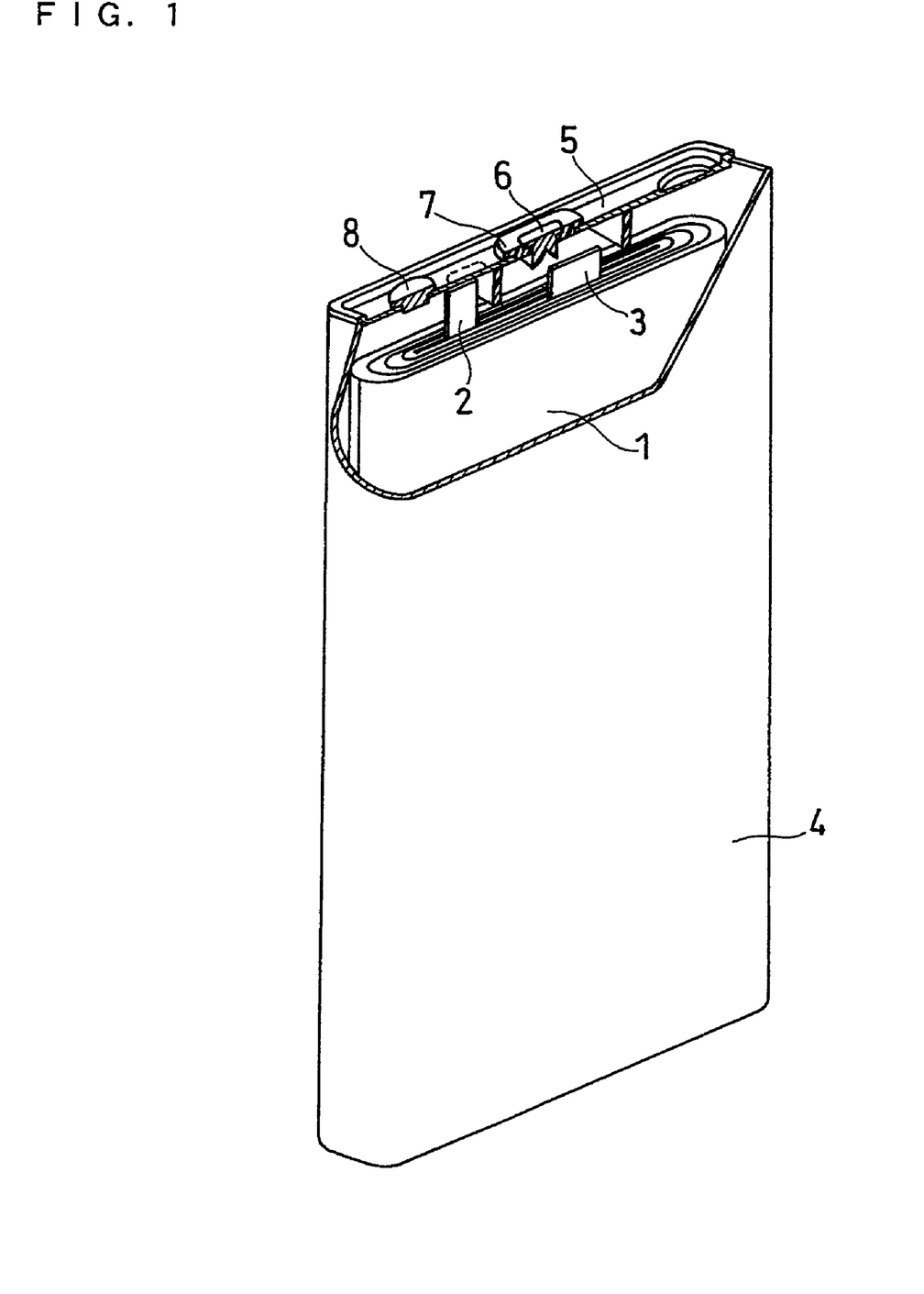
FIG. 1 is a partially cut-away perspective view of a non-aqueous electrolyte secondary battery in accordance with one embodiment of the invention.

One embodiment of the non-aqueous electrolyte secondary battery of the invention is described. FIG. 1 is a partially cut-away perspective view of a prismatic non-aqueous electrolyte secondary battery in one embodiment of the invention.

The non-aqueous electrolyte secondary battery includes an electrode assembly 1 that is prepared by winding a positive electrode and a negative electrode, with an insulating layer and, if necessary, a separator interposed therebetween. The electrode assembly 1 and a non-aqueous electrolyte (not shown) are housed in a prismatic battery case 4. Disposed on the electrode assembly 1 is a resin frame (not shown) which separates the electrode assembly 1 from a seal plate 5 and prevents contact between a positive electrode lead 2 or negative electrode lead 3 and the battery case 4. The seal plate 5 is provided with a negative electrode terminal 6 and an injection hole for non-aqueous electrolyte, and the injection hole is closed with a seal stopper 8. The positive electrode lead 2 is connected to the underside of the seal plate 5, while the negative electrode lead 3 is connected to the negative electrode terminal 6. The negative electrode terminal 6 is insulated from the seal plate 5 by a gasket 7.

Figure 2:
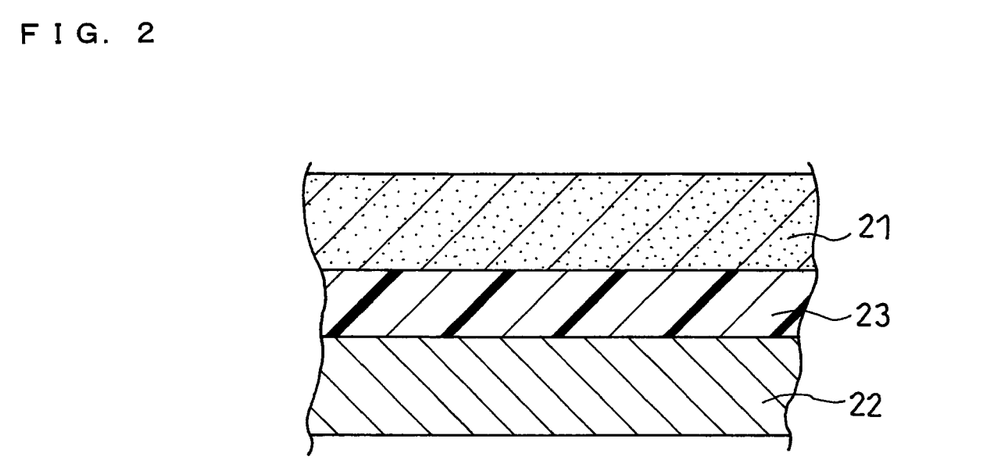
FIG. 2 is an enlarged view of the main part of an electrode assembly in accordance with one embodiment of the invention.
Figure 3:
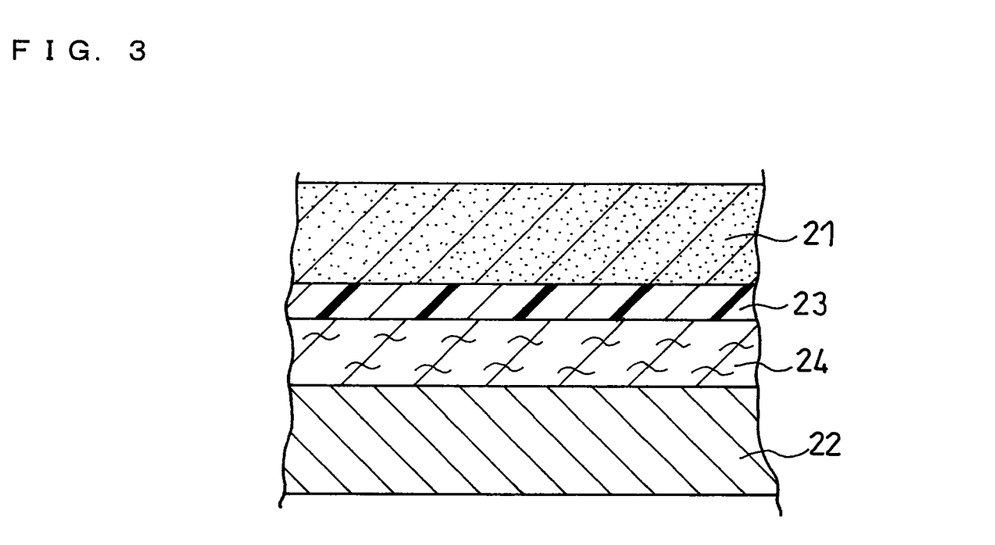
FIG. 3 is an enlarged view of the main part of an electrode assembly in accordance with another embodiment of the invention.

FIG. 2 shows an enlarged view of the main part of an exemplary electrode assembly, and FIG. 3 shows an enlarged view of the main part of another exemplary electrode assembly. Each of the electrode assemblies includes a positive electrode 21, a negative electrode 22, and an insulating layer 23. The insulating layer 23 is formed on the positive electrode 21. FIG. 2 does not include a separator 24, but FIG. 3 includes the separator 24.

It should be noted that the battery shape is not particularly limited and that other shapes such as cylindrical and layered shapes than the above-described prismatic shape can also produce essentially the same effects.

EXAMPLES

The invention is hereinafter described specifically by way of Examples and Comparative Examples.

Example 1

(a) Preparation of Positive Electrode 100 parts by weight of $LiNi_{0.8}Co_{0.2}O_2$ (positive electrode active material) was mixed with 2 parts by weight of acetylene black (conductive agent), 3 parts by weight of polyvinylidene fluoride (PVDF)(binder), and a suitable amount of N-methyl-2-pyrrolidone (dispersion medium). This mixture was kneaded and stirred with a mixer, to form a positive electrode mixture paste. The $LiNi_{0.8}Co_{0.2}O_2$ had a mean particle size of 10 μm.

The positive electrode mixture paste was intermittently applied onto both sides of a positive electrode current collector made of a 15-μm thick aluminum foil sheet and dried. The positive electrode current collector with the positive electrode mixture layers formed thereon was rolled with rollers.

After the rolling, an aluminum positive electrode lead was ultrasonically welded to the positive electrode current collector. Further, an insulating tape made of polypropylene resin was attached to the welded area having the lead in order to prevent an internal short-circuit. The current collector was then cut to a predetermined size, to obtain a positive electrode with a width of 42 mm, a length of 538 mm, and a thickness of 130 μm.

(b) Formation of Insulating Layer

An insulating paste was prepared by dissolving 5 parts by weight of PVDF (insulating polymeric material) in 100 parts by weight of N-methyl-2-pyrrolidone. The insulating paste was applied onto both sides of the positive electrode and dried to form insulating layers with a thickness of 5 μm.

(c) Preparation of Negative Electrode 100 parts by weight of flake graphite with a mean particle size of 10 μm (negative electrode active material) was mixed with an aqueous dispersion of styrene butadiene rubber (SBR, binder) (the SBR solid content: 1 part by weight), 1 part by weight of carboxymethyl cellulose (thickener), and a suitable amount of water (dispersion medium). This mixture was kneaded and stirred to form a negative electrode mixture paste.

The negative electrode mixture paste was intermittently applied onto both sides of a negative electrode current collector made of a 10-μm thick copper foil sheet and dried. The negative electrode current collector with the negative electrode mixture layers formed thereon was rolled with rollers.

After the rolling, a nickel negative electrode lead was spot welded to the negative electrode current collector. Further, an insulating tape made of polypropylene resin was attached to the welded area having the lead in order to prevent an internal short-circuit. The current collector was then cut to a predetermined size, to obtain a negative electrode with a width of 43 mm, a length of 519 mm, and a thickness of 155 μm.

(d) Fabrication of Electrode Assembly

A 20-μm thick microporous film made of polyethylene resin was used as the separator.

The positive electrode, the negative electrode, and the separator separating the positive electrode from the negative electrode were wound so as to make the cross-section oval. The resulting electrode assembly was pressed from the side face at a pressure of 6.5 MPa for 5 seconds to make the electrode assembly flat.

(e) Preparation of Non-Aqueous Electrolyte

A non-aqueous solvent for non-aqueous electrolyte was prepared by adding 1 part by weight of vinylene carbonate (VC) to 99 parts by weight of a solvent mixture containing ethylene carbonate (EC), propylene carbonate (PC), and diethyl carbonate (DEC) in a weight ratio of 4:4:2. $LiPF_6$ (solute) was dissolved in this non-aqueous solvent to obtain a non-aqueous electrolyte with a concentration of 1.0 M.

(f) Production of Non-Aqueous Electrolyte Secondary Battery

The electrode assembly was placed in a prismatic battery case with a bottom. The battery case was made of a JIS 3000-series aluminum alloy containing trace amounts of metals such as manganese and copper. The battery case was a prismatic one with a wall thickness of 0.25 mm, a width of 6.3 mm, a length of 34.0 mm, and a height of 50.0 mm. The electrode assembly and the battery case were dried at a dew point of −30° C. and a temperature of 60° C. for 12 hours.

A seal plate with an injection hole was laser welded to the opening of the battery case, and the non-aqueous electrolyte was injected from the injection hole. Thereafter, the injection hole was closed with a stopper and sealed with a laser, to obtain a battery A with a design capacity of 1450 mAh.

Example 2

A battery B was produced in the same manner as in Example 1, except for the use of insulating layers containing insulating inorganic oxide particles and an insulating polymeric material. Specifically, an insulating paste was prepared by kneading and stirring 100 parts by weight of alumina particles (insulating inorganic oxide particles) with a mean particle size of 0.5 μm, 4 parts by weight of PVDF (insulating polymeric material), and N-methyl-2-pyrrolidone (dispersion medium). This insulating paste was applied onto both sides of the positive electrode and dried to form 5-μm thick insulating layers.

Example 3

A battery C with a design capacity of 1457 mAh was produced in the same manner as in Example 1, except that 25-μm thick insulating layers were formed by applying an insulating paste that was prepared in the same manner as in Example 2 onto both sides of the positive electrode and drying it, and that no separator was used.

Example 4

A battery D was produced in the same manner as in Example 2, except that a non-aqueous solvent was prepared by adding 1 part by weight of VC to 99 parts by weight of a solvent mixture containing EC and PC in a weight ratio of 5:5.

Example 5

A battery E was produced in the same manner as in Example 2, except that a non-aqueous solvent was prepared by adding 1 part by weight of VC to 99 parts by weight of a solvent mixture containing EC, PC, and DEC in a weight ratio of 3:3:4.

Example 6

A battery F was produced in the same manner as in Example 2, except that a non-aqueous solvent was prepared by adding 1 part by weight of VC to 99 parts by weight of a solvent mixture containing EC, PC, and DEC in a weight ratio of 2:4:4.

Example 7

A battery G was produced in the same manner as in Example 2, except that a non-aqueous solvent was prepared by adding 1 part by weight of VC to 99 parts by weight of a solvent mixture containing EC, PC, and DEC in a weight ratio of 2:2:6.

Example 8

A battery H with a design capacity of 1357 mAh was produced in the same manner as in Example 2, except that $LiNi_{0.6}Co_{0.4}O_2$ was used as the positive electrode active material.

Example 9

A battery I with a design capacity of 1265 mAh was produced in the same manner as in Example 2, except that $LiNi_{0.6}Co_{0.2}Mn_{0.2}O_2$ was used as the positive electrode active material.

Comparative Example 1

A battery J was produced in the same manner as in Example 1, except that no insulating layer was formed.

Comparative Example 2

A battery K was produced in the same manner as in Example 2, except that a non-aqueous solvent was prepared by adding 1 part by weight of VC to 99 parts by weight of a solvent mixture containing EC and DEC in a weight ratio of 2:8.

Comparative Example 3

A battery L with a design capacity of 1357 mAh was produced in the same manner as in Comparative Example 1, except that $LiNi_{0.6}Co_{0.4}O_2$ was used as the positive electrode active material.

Comparative Example 4

A battery M with a design capacity of 1265 mAh was produced in the same manner as in Comparative Example 1, except that $LiNi_{0.6}Co_{0.2}Mn_{0.2}O_2$ was used as the positive electrode active material.

Comparative Example 5

A battery N with a design capacity of 1173 mAh was produced in the same manner as in Example 2, except that $LiNi_{0.2}Co_{0.8}O_2$ was used as the positive electrode active material.

Comparative Example 6

A battery O with a design capacity of 1173 mAh was produced in the same manner as in Comparative Example 1, except that $LiNi_{0.2}Co_{0.8}O_2$ was used as the positive electrode active material.

Comparative Example 7

A battery P with a design capacity of 1150 mAh was produced in the same manner as in Example 2, except that $LiNi_{0.33}Co_{0.33}Mn_{0.33}O_2$ was used as the positive electrode active material.

Comparative Example 8

A battery Q with a design capacity of 1150 mAh was produced in the same manner as in Comparative Example 1, except that $LiNi_{0.33}Co_{0.33}Mn_{0.33}O_2$ was used as the positive electrode active material.

Table 1 summarizes the features of the batteries A to Q of Examples and Comparative Examples.

TABLE 1

| | Battery | Positive electrode active material | Non-aqueous solvent | Inorganic oxide particles | Thickness of insulating layer (μm) | Thickness of separator (μm) |
|---|---|---|---|---|---|---|
| Example 1 | A | $LiNi_{0.8}Co_{0.2}O_2$ | EC/PC/DEC = 4/4/2 + VC1% | Not included | 5 | 20 |
| Example 2 | B | $LiNi_{0.8}Co_{0.2}O_2$ | EC/PC/DEC = 4/4/2 + VC1% | Included | 5 | 20 |
| Example 3 | C | $LiNi_{0.8}Co_{0.2}O_2$ | EC/PC/DEC = 4/4/2 + VC1% | Included | 25 | None |
| Example 4 | D | $LiNi_{0.8}Co_{0.2}O_2$ | EC/PC = 5/5 + VC1% | Included | 5 | 20 |
| Example 5 | E | $LiNi_{0.8}Co_{0.2}O_2$ | EC/PC/DEC = 3/3/4 + VC1% | Included | 5 | 20 |
| Example 6 | F | $LiNi_{0.8}Co_{0.2}O_2$ | EC/PC/DEC = 2/4/4 + VC1% | Included | 5 | 20 |
| Example 7 | G | $LiNi_{0.8}Co_{0.2}O_2$ | EC/PC/DEC = 2/2/6 + VC1% | Included | 5 | 20 |
| Example 8 | H | $LiNi_{0.6}Co_{0.4}O_2$ | EC/PC/DEC = 4/4/2 + VC1% | Included | 5 | 20 |
| Example 9 | I | $LiNi_{0.6}Co_{0.2}Mn_{0.2}O_2$ | EC/PC/DEC = 4/4/2 + VC1% | Included | 5 | 20 |
| Comparative Example 1 | J | $LiNi_{0.8}Co_{0.2}O_2$ | EC/PC/DEC = 4/4/2 + VC1% | Not included | None | 20 |
| Comparative Example 2 | K | $LiNi_{0.8}Co_{0.2}O_2$ | EC/DEC = 2/8 + VC1% | Included | 5 | 20 |
| Comparative Example 3 | L | $LiNi_{0.6}Co_{0.4}O_2$ | EC/PC/DEC = 4/4/2 + VC1% | Not included | None | 20 |
| Comparative Example 4 | M | $LiNi_{0.6}Co_{0.2}Mn_{0.2}O_2$ | EC/PC/DEC = 4/4/2 + VC1% | Not included | None | 20 |
| Comparative Example 5 | N | $LiNi_{0.2}Co_{0.8}O_2$ | EC/PC/DEC = 4/4/2 + VC1% | Included | 5 | 20 |
| Comparative Example 6 | O | $LiNi_{0.2}Co_{0.8}O_2$ | EC/PC/DEC = 4/4/2 + VC1% | Not included | None | 20 |
| Comparative Example 7 | P | $LiNi_{0.33}Co_{0.33}Mn_{0.33}O_2$ | EC/PC/DEC = 4/4/2 + VC1% | Included | 5 | 20 |
| Comparative Example 8 | Q | $LiNi_{0.33}Co_{0.33}Mn_{0.33}O_2$ | EC/PC/DEC = 4/4/2 + VC1% | Not included | None | 20 |

The batteries A to Q of Examples and Comparative Examples were evaluated for battery capacity and the amount of gas produced due to storage at a high temperature. Table 2 shows the results.

(i) Battery Capacity

At 25° C., each battery was charged at a constant current of 0.2 C (5 hour rate) to an end-of-charge voltage of 4.2 V, and then charged at the constant voltage of 4.2 V to a cut-off current of 0.05 C (20 hour rate). It was then discharged at a discharge current of 0.2 C to an end-of-discharge voltage of 3.0 V. The discharge capacity obtained was defined as battery capacity.

(ii) The Amount of Gas Produced Due to High Temperature Storage

After each battery was charged under the same charge conditions as those for the battery capacity evaluation, the battery was stored at 80° C. for 48 hours. Thereafter, the battery was placed in a polytetrafluoroethylene bag. The bag was then filled with a predetermined amount of argon gas and sealed. In the bag, a hole was made in an upper part of the battery to release the gas inside the battery, and the released gas was collected. From the peak area ratio of the chromatography of the gas, the amount of gas produced due to high temperature storage was calculated. Table 2 shows the results.

TABLE 2

| | Prismatic battery | Battery capacity (mAh) | Amount of gas (ml) |
|---|---|---|---|
| Example 1 | A | 1450 | 1.10 |
| Example 2 | B | 1450 | 0.99 |
| Example 3 | C | 1450 | 0.98 |
| Example 4 | D | 1446 | 0.96 |
| Example 5 | E | 1451 | 1.05 |
| Example 6 | F | 1453 | 1.02 |
| Example 7 | G | 1448 | 1.12 |
| Example 8 | H | 1350 | 0.88 |
| Example 9 | I | 1259 | 0.84 |
| Comparative Example 1 | J | 1442 | 2.77 |
| Comparative Example 2 | K | 1453 | 1.85 |
| Comparative Example 3 | L | 1341 | 2.04 |
| Comparative Example 4 | M | 1250 | 1.89 |
| Comparative Example 5 | N | 1165 | 0.73 |
| Comparative Example 6 | O | 1165 | 0.79 |
| Comparative Example 7 | P | 1140 | 0.71 |
| Comparative Example 8 | Q | 1140 | 0.77 |

As is clear from Table 2, each of the batteries A to I of Examples had an excellent battery capacity, and exhibited a reduced amount of gas production.

In a comparison between the battery A and the battery B, the amount of gas produced by the battery B was smaller. This is probably because the insulating inorganic oxide particles included in the insulating layers of the battery B further improved the electrolyte-retaining ability of the insulating layers, thereby allowing the electrode reaction to proceed more uniformly.

The battery B had a battery capacity almost equivalent to that of the battery J, but the amount of gas produced by the battery B due to high temperature storage was significantly smaller. This is probably because the insulating layers formed on the positive electrode protected the positive electrode surface, thereby suppressing the oxidative decomposition of the cyclic carbonic acid esters at the positive electrode during the high temperature storage and suppressing the gas production.

The battery B had a battery capacity almost equivalent to that of the battery K, but the amount of gas produced by the battery B due to high temperature storage was significantly smaller. This is probably because the non-aqueous electrolyte of the battery B contained a large amount of the cyclic carbonic acid esters, thereby suppressing the reductive decomposition of the non-aqueous electrolyte at the negative electrode.

The batteries C to G exhibited battery capacities and amounts of gas production which were equivalent to those of the battery B. This indicates that the preferable amount of the cyclic carbonic acid esters is 40% by weight or more. Also, the batteries A to F and H to I exhibited smaller amounts of gas production than the battery G. This shows that when the amount of the cyclic carbonic acid esters is 60% by weight or more, gas production can be further suppressed.

The results of the batteries B, H, I, L, and M indicate that the formation of the insulating layers on the positive electrode can produce the effect of suppressing gas production in the case of the positive electrode active materials represented by the general formula: $Li_xNi_yM_{1-y}O_2$ where the nickel ratio y is higher than 0.5.

Also, in a comparison between the battery N and the battery O and between the battery P and the battery Q, there was not a large difference in the amount of gas produced due to high temperature storage. That is, in the case of the positive electrode active materials represented by the general formula: $Li_xNi_yM_{1-y}O_2$ where the nickel ratio y is not higher than 0.5, the formation of the insulating layers on the positive electrode did not make a difference in the amount of gas produced. This indicates that the effect of the invention is unique to the use of a positive electrode active material with a high nickel content. It should be noted, however, that the batteries N to Q had significantly smaller battery capacities than the battery B, although they exhibited small amounts of gas production.

In the foregoing Examples and Comparative Examples, PVDF was used as the insulating polymeric material, but the use of modified PVDF, acrylic rubber-based adhesive, modified acrylic rubber, etc. as the insulating polymeric material can also produce essentially the same effect.

In the foregoing Examples and Comparative Examples, flake graphite was used as the negative electrode active material, but the use of spherical graphite, non-graphitizable carbon, partially graphitized carbon, an alloy-based negative electrode active material, etc. as the negative electrode active material can also produce essentially the same effect.

In the foregoing Examples and Comparative Examples, alumina was used as the insulating inorganic oxide particles, but the use of zirconia, silica, titania, magnesia, etc. as the insulating inorganic oxide particles can also produce essentially the same effect.

The non-aqueous electrolyte secondary battery of the invention has a high capacity and high reliability and suppresses gas production. Therefore, it is useful, for example, as the power source for portable appliances, power storage devices, and electric vehicles.

Although the invention has been described in terms of the presently preferred embodiments, it is to be understood that such disclosure is not to be interpreted as limiting. Various alterations and modifications will no doubt become apparent to those skilled in the art to which the invention pertains, after having read the above disclosure. Accordingly, it is intended that the appended claims be interpreted as covering all alterations and modifications as fall within the true spirit and scope of the invention.

The invention claimed is:

1. A non-aqueous electrolyte secondary battery comprising:
    a positive electrode comprising a positive electrode current collector and a positive electrode active material layer formed on the positive electrode current collector, said positive electrode active material layer including a lithium nickel composite oxide having a layer structure, the lithium nickel composite oxide being represented by the general formula:
    $Li_xNi_yM_{1-y}O_2$ where M is at least one selected from the group consisting of Na, Mg, Sc, Y, Mn, Fe, Co, Cu, Zn, Al, Cr, Pb, Sb, and B, $0<x\leq1.2$ and $0.5<y\leq1.0$;
    a negative electrode;
    a separator between the positive electrode and the negative electrode;
    a non-aqueous electrolyte including a solute and a non-aqueous solvent dissolving the solute, the non-aqueous solvent containing 60% by weight or more and 90% by weight or less of a cyclic carbonic acid ester; and
    an insulating layer adhered to a surface of the positive electrode active material layer, the insulating layer being porous and including an insulating polymeric material and insulating inorganic oxide particles.

2. The non-aqueous electrolyte secondary battery in accordance with claim 1, wherein the cyclic carbonic acid ester includes at least one selected from the group consisting of ethylene carbonate and propylene carbonate.

3. The non-aqueous electrolyte secondary battery in accordance with claim 1, wherein the insulating polymeric material includes at least one selected from the group consisting of fluorocarbon resin and modified acrylic rubber.

4. The non-aqueous electrolyte secondary battery in accordance with claim 1, wherein the insulating inorganic oxide particles include at least one selected from the group consisting of alumina, zirconia, silica, titania, and magnesia.

* * * * *